US012682332B2

(12) United States Patent
Mattison et al.

(10) Patent No.: US 12,682,332 B2
(45) Date of Patent: Jul. 14, 2026

(54) SELF-SERVICE KIOSK INVENTORY CONTROL

(71) Applicant: Bank of America Corporation, Charlotte, NC (US)

(72) Inventors: Paul Mattison, Sherrills Ford, NC (US); Matthew E. Williams, Frisco, TX (US)

(73) Assignee: Bank of America Corporation, Charlotte, NC (US)

( * ) Notice: Subject to any disclaimer, the term of this patent is extended or adjusted under 35 U.S.C. 154(b) by 376 days.

(21) Appl. No.: 18/120,480

(22) Filed: Mar. 13, 2023

(65) Prior Publication Data

US 2024/0311788 A1     Sep. 19, 2024

(51) Int. Cl.
*G06Q 20/20* (2012.01)
*G06Q 20/18* (2012.01)

(52) U.S. Cl.
CPC .......... *G06Q 20/203* (2013.01); *G06Q 20/18* (2013.01)

(58) Field of Classification Search
CPC .... G06Q 20/203; G06Q 20/18; G06Q 10/087; G07F 9/026; G07F 19/20; G07F 19/203; G07F 19/209; G07F 19/202
See application file for complete search history.

(56) References Cited

U.S. PATENT DOCUMENTS

| | | | |
|---|---|---|---|
| 6,026,175 A | 2/2000 | Munro et al. | |
| 6,351,552 B1 | 2/2002 | Weaver et al. | |
| 6,783,061 B2 | 8/2004 | Graef et al. | |
| 7,513,413 B2 | 4/2009 | Graef et al. | |
| 7,694,797 B2 | 4/2010 | Takeuchi et al. | |
| 7,903,863 B2 * | 3/2011 | Jones .................... | G07F 19/202 |
| | | | 705/45 |
| 8,339,589 B2 | 12/2012 | Jones et al. | |
| 8,474,708 B2 | 7/2013 | Laskowski | |
| 8,824,771 B2 | 9/2014 | Klein | |
| 8,925,797 B1 * | 1/2015 | Bohen .................. | G07F 19/202 |
| | | | 235/379 |

(Continued)

OTHER PUBLICATIONS

Lazaro, Jorge et al. (2018). Improving cash logistics in bank branches by coupling machine learning and robust optimization. Expert Systems with Applciations 92 (2018) 236-255. (Year: 2018).*

*Primary Examiner* — Peter Ludwig
(74) *Attorney, Agent, or Firm* — Banner & Witcoff, Ltd.

(57) ABSTRACT

Arrangements for self-service kiosk inventory control are provided. In some aspects, note data may be received by a computing platform from a self-service kiosk and may include note identifiers. The computing platform may monitor the self-service kiosk for a triggering event. Responsive to detecting the triggering event, the computing platform may generate and send an instruction to the self-service kiosk causing the self-service kiosk to initiate a rescan function. The the rescan function may cause the self-service kiosk to recapture a note identifier associated with each note of currency currently within the self-service kiosk. The results of the rescan may be compared to the received note data to determine whether all expected notes are within the self-service kiosk. If not, a service instruction may be generated and sent, an instruction causing the self-service kiosk to modify functionality may be generated and sent, or the like.

21 Claims, 13 Drawing Sheets

(56)          References Cited

U.S. PATENT DOCUMENTS

| | | | | |
|---|---|---|---|---|
| 10,621,833 B1 * | 4/2020 | Dadhaniya | ............ | G07F 19/203 |
| 10,796,537 B1 | 10/2020 | Farivar et al. | | |
| 10,977,889 B1 * | 4/2021 | McCabe | ............... | G07D 11/23 |
| 11,145,022 B1 * | 10/2021 | Albero | ............... | G06Q 20/1085 |
| 11,763,381 B2 * | 9/2023 | Albero | ............... | G06F 16/2379 |
| | | | | 705/43 |
| 2005/0213803 A1 * | 9/2005 | Mennie | .................... | G07D 7/17 |
| | | | | 382/135 |
| 2010/0082443 A1 * | 4/2010 | Folk | ....................... | G06Q 20/18 |
| | | | | 705/16 |
| 2010/0237145 A1 * | 9/2010 | Silverbrook | ......... | G06Q 30/018 |
| | | | | 235/375 |
| 2010/0280878 A1 * | 11/2010 | Wilson | .................. | G06Q 40/12 |
| | | | | 705/16 |
| 2014/0222660 A1 * | 8/2014 | Huang | ................. | G07F 19/209 |
| | | | | 705/39 |
| 2019/0236594 A1 * | 8/2019 | Ehrlich-Quinn | ..... | G06Q 20/401 |
| 2020/0349792 A1 * | 11/2020 | Morgan | ................. | G07D 7/189 |
| 2021/0264711 A1 * | 8/2021 | Steinlin | ............... | G06N 3/0464 |
| 2021/0342964 A1 * | 11/2021 | Albero | ............... | G06Q 20/1085 |
| 2022/0207952 A1 * | 6/2022 | Hunt | ...................... | G06Q 20/20 |
| 2023/0075651 A1 * | 3/2023 | Lyons | ................. | G07F 17/322 |
| 2024/0193562 A1 * | 6/2024 | Pratten | .............. | G06Q 20/1085 |
| 2024/0311788 A1 * | 9/2024 | Mattison | ............... | G06Q 20/18 |

* cited by examiner

110

111

112

Self-Service Kiosk Inventory Control Computing Platform

Processor(s)

Memory(s)

Registration Module
112a

Note Identifier Data Module
112b

Triggering Event Module
112c

Reconciliation Module
112d

Note Analysis Module
112e

Device Service Module
112f

Machine Learning Engine
112g

Database
112h

113

Communication Interface(s)

130

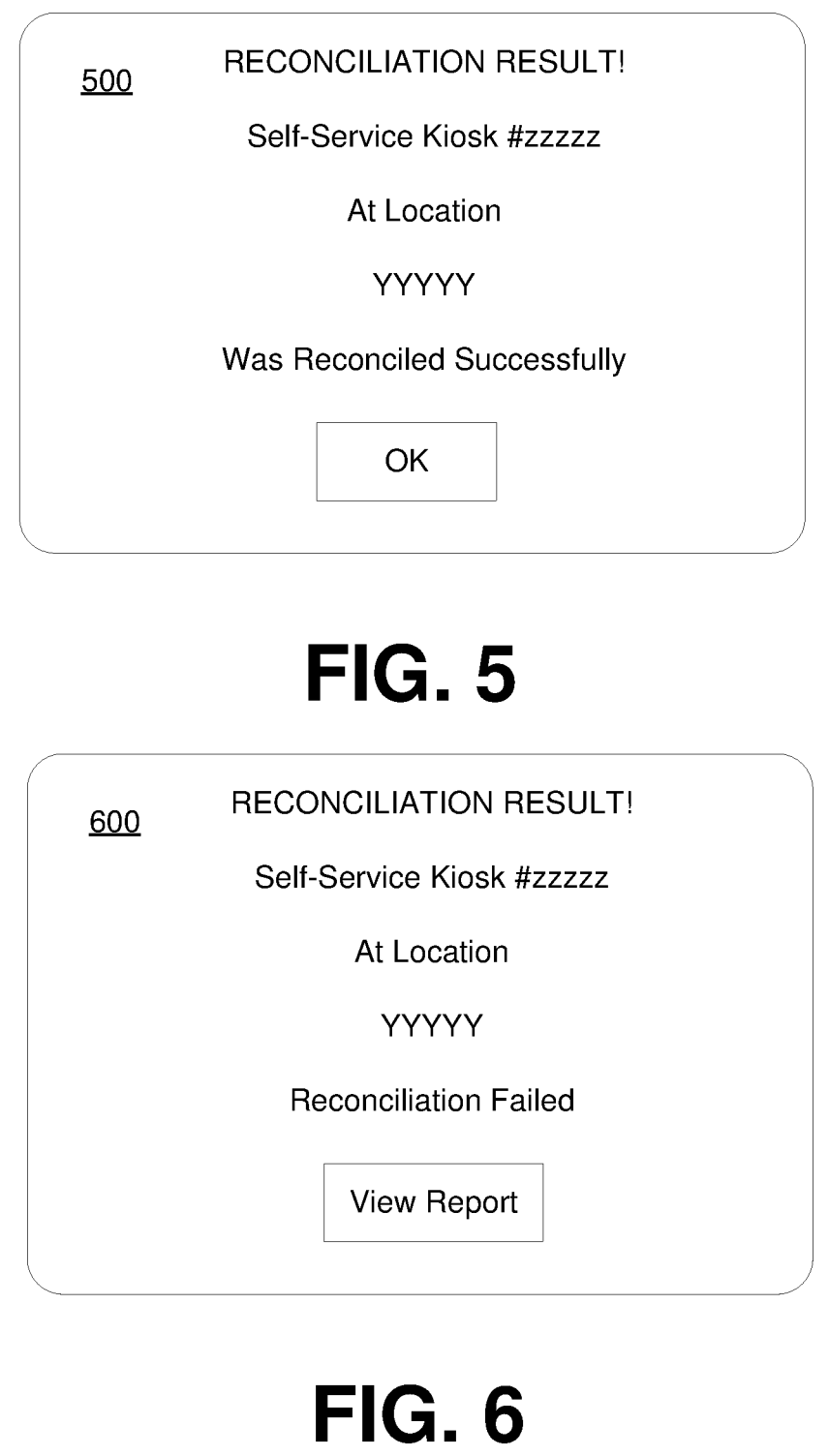

RECONCILIATION RESULT!

500

Self-Service Kiosk #zzzzz

At Location

YYYYY

Was Reconciled Successfully

RECONCILIATION RESULT!

600

Self-Service Kiosk #zzzzz

At Location

YYYYY

Reconciliation Failed

View Report

FIG. 6

SELF-SERVICE KIOSK INVENTORY CONTROL

BACKGROUND

Aspects of the disclosure relate to electrical computers, systems, and devices for real-time inventory capture and control in self-service kiosks.

Self-service kiosks are a popular device for processing transactions. However, maintaining self-service kiosks can be costly and time consuming. In conventional arrangements, it may be difficult or impossible to know exactly how many notes of currency, or notes of a particular denomination, are present in the self-service kiosk at any given time or in real-time. Further, conventional arrangements require an administrator or other user to periodically reconcile the machines. Accordingly, it would be advantageous to have real-time inventory data and capability to self-audit or self-reconcile for a self-service kiosk based on unique identifiers associated with each note of currency.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with managing self-service kiosk inventory in real-time and reconciling self-service kiosks.

In some aspects, first note data may be received by a computing platform. The first note data may be received from a self-service kiosk and may include note identifiers associated with notes loaded into the self-service kiosk during a loading or rebalancing service, notes received from users through a deposit transaction and may include notes dispensed from the self-service kiosk to users during withdrawal transactions.

In some examples, the computing platform may monitor the self-service kiosk for a triggering event, such as a scheduled reconciliation, an indication of an issue or malfunction, expiration of a predetermined time since a reconciliation, or the like. Responsive to detecting the triggering event, the computing platform may generate and send an instruction to the self-service kiosk causing the self-service kiosk to initiate a rescan function. In some examples, the rescan function may cause the self-service kiosk to recapture a note identifier associated with each note of currency currently within the self-service kiosk at a current time. The results of the rescan (e.g., note identifiers) may be received by the self-service kiosk.

In some arrangements, the results of the rescan may be compared to the received first note data to determine whether all expected notes are within the self-service kiosk. If so, the notes may continue to be used in transactions. If not, in some examples, a service instruction may be generated and sent, an instruction causing the self-service kiosk to modify functionality may be generated and sent, or the like.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 5 and 6 illustrate example user interface that may be generated in accordance with one or more aspects described herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, self-service kiosks are an increasingly popular channel for processing transactions. However, maintaining self-service kiosks can be inefficient. In particular, conventional self-service kiosks may require a user to rebalance or reconcile the machine. Further, it may be difficult to efficiently perform functions (e.g., dispense funds) without a real-time understanding of the inventory of notes in the self-service kiosk.

Accordingly, aspects described herein provide real-time management and control of self-service kiosk inventory and enable self-auditing or self-reconciliation of the self-service kiosk. For instance, each note received by the self-service kiosk may be scanned to capture note data including a unique note identifier, such as a serial number, of each note. As notes are used in transactions (e.g., received via deposits, dispensed via withdrawals), the notes may be scanned to capture the note identifier with each note and record receipt or dispensing of the note.

Upon detection of a triggering event, a self-service kiosk may initiate a rescan function. The rescan function may include rescanning all notes currently within the self-service kiosk at a current time to obtain note identifiers for each note. The note identifiers from the rescan may be compared to the note data to determine whether all expected notes are within the self-service kiosk.

These and various other arrangements will be discussed more fully below.

Figure 1A:
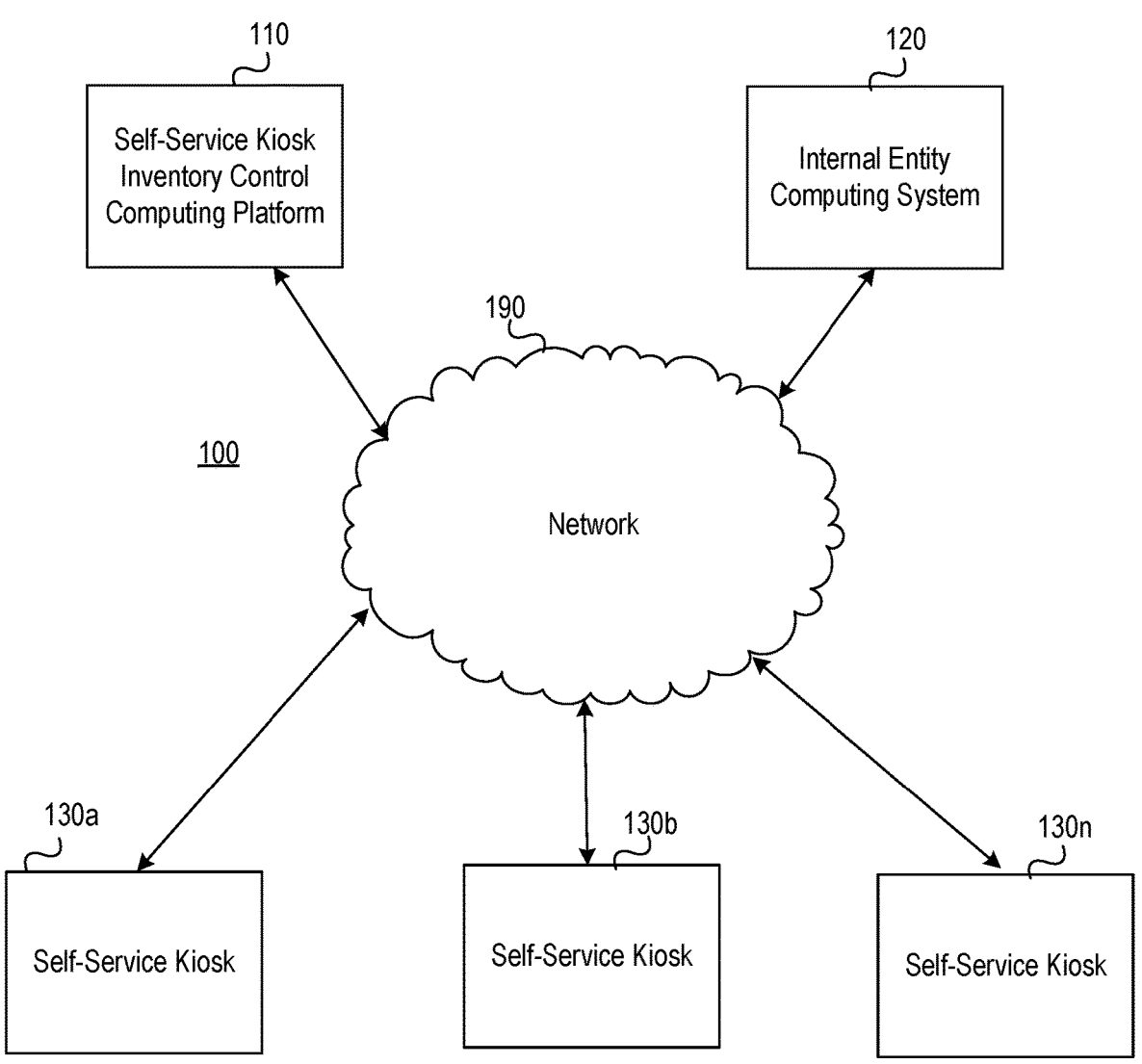
FIGS. 1A and 1B depict an illustrative computing environment for implementing self-service kiosk inventory control functions in accordance with one or more aspects described herein.
Figure 1B:
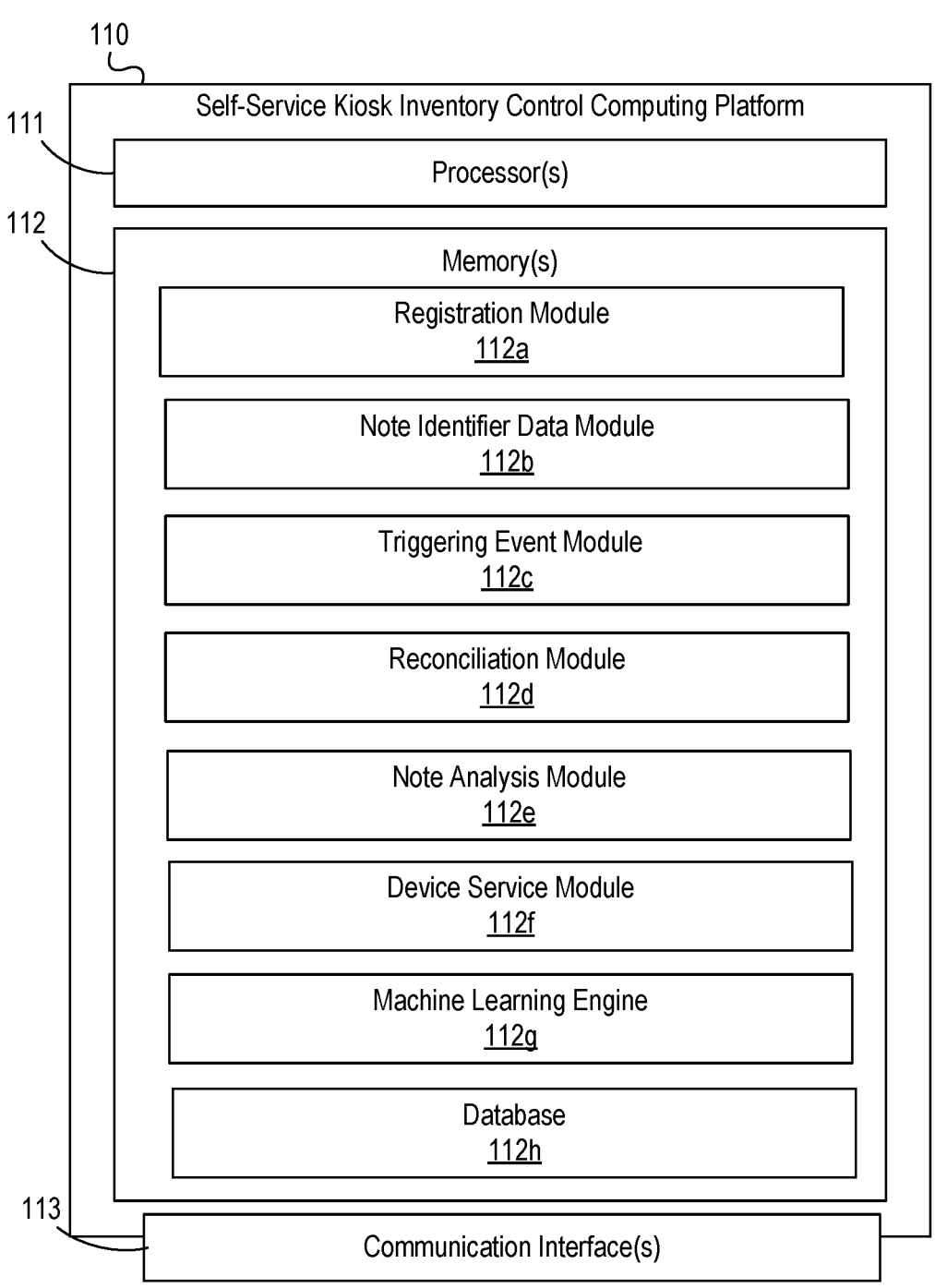

Aspects described herein may be implemented using one or more computing devices operating in a computing environment. For instance, FIGS. 1A-1B depict an illustrative computing environment for implementing self-service kiosk inventory control functions in accordance with one or more aspects described herein. Referring to FIG. 1A, computing environment 100 may include one or more computing devices and/or other computing systems. For example, computing environment 100 may include self-service kiosk inventory control computing platform 110, internal entity computing system 120, and a plurality of self-service kiosks 130a-130n, such as automated teller machines (ATMs), automated teller assistants (ATAs), or the like. Although one internal entity computing system 120 and three self-service kiosks 130a-130n are shown, any number of systems or devices may be used without departing from the invention. Further, while self-service kiosk inventory control computing platform 110 is shown as a separate device from self-service kiosk 130, the self-service kiosk inventory computing platform 110 may be integrated with one or more self-service kiosks 130 (e.g., part of a same device).

Self-service kiosk inventory control computing platform 110 may be configured to perform intelligent, dynamic, and efficient self-service kiosk inventory functions. For instance, self-service kiosk inventory control computing platform 110 may receive self-service kiosk inventory data including a note identifier associated with a plurality of notes of currency in the self-service kiosk 130. For instance, when a self-service kiosk is loaded with funds, each note of currency may be scanned or otherwise imaged to capture note identifying data, such as a serial number, denomination, or the like. This note identifying data for the loaded notes may be stored by the self-service kiosk inventory control computing platform 110.

As the self-service kiosk is used to process transactions (e.g., withdrawals, deposits, or the like), notes of currency may be transferred into or out of the self-service kiosk 130. Accordingly, when a note is received by the self-service kiosk (e.g., via deposit) the note may be scanned or imaged to capture the note identifying data. This note identifying data associated with transaction notes may be stored by the self-service kiosk inventory control computing platform 110.

As notes of currency are dispensed from the self-service kiosk 130 (e.g., via withdrawal functions), the notes being dispensed may be imaged or scanned to capture the note identifiers of the notes being dispensed. These note identifiers for dispensed notes may be stored by the self-service kiosk inventory control computing platform 110.

In some examples, as notes are received by the self-service kiosk inventory control computing platform 110, the note identifier for each note may be analyzed to determine whether it corresponds to a note in circulation for at least a threshold time period (e.g., at least 5 years, at least 3 years, or the like). Because note quality deteriorates as the notes circulate, it may be advantageous to identify notes in circulation for at least a threshold time period and remove those notes from circulation to avoid malfunctions of the self-service kiosk. Accordingly, the note identifiers may be analyzed to determine if they meet the threshold criteria and, if so, may be transferred to a holding area within the self-service kiosk for removal from circulation.

The self-service kiosk inventory control computing platform 110 may monitor the plurality of self-service kiosks 130a-130n for a triggering event (e.g., a predetermined time period has elapsed, a day or date trigger has occurred, an inventory within the self-service kiosk has indicated service is needed, or the like). If a triggering event is detecting, the self-service kiosk inventory control computing platform 110 may initiate, at the self-service kiosk impacted, a reconciling or auditing process. Accordingly, the self-service kiosk 130 may initiate a rescan of all notes within the self-service kiosk 130. The rescan note identifiers may be compared to the loaded note identifiers and transaction note identifiers (e.g., identifiers associated with notes received or dispensed via transactions) to determine whether the notes within the machine match expected notes. If so, the self-service kiosk 130 may continue processing. If not, one or more actions may be initiated (e.g., service call, modification of functionality of the self-service kiosk, or the like).

Internal entity computing system 120 may be or include or more computing devices (e.g., servers, server blades, or the like) and/or one or more computing components (e.g., memory, processor, and the like) and may be configured to control or configure service calls for one or more self-service kiosks, control operations of one or more self-service kiosks, or the like.

Self-service kiosks 130a-130n may be or include one or more computing devices (e.g., servers, server blades, or the like) and/or one or more computing components (e.g., memory, processor, and the like) and may be configured to process transactions, such as deposits, withdrawals, balance inquiries, and the like. Self-service kiosks 130a-130n may be separate from self-service kiosk inventory control computing platform 110 for may be part of a same device. Further, while a plurality of self-service kiosks 130a-130n are shown, aspects described herein may be described in the context of self-service kiosk 130, which may be an example self-service kiosk and may be one of self-service kiosk 130a-130n. Additional details associated with self-service kiosk 130 will be described more fully herein.

As mentioned above, computing environment 100 also may include one or more networks, which may interconnect one or more of self-service kiosk inventory control computing platform 110, internal entity computing system 120, and self-service kiosks 130a-130n. For example, computing environment 100 may include network 190. In some examples, network 190 may include a private network associated with the enterprise organization. Network 190 may include one or more sub-networks (e.g., Local Area Networks (LANs), Wide Area Networks (WANs), or the like). Network 190 may be associated with a particular organization (e.g., a corporation, financial institution, educational institution, governmental institution, or the like) and may interconnect one or more computing devices associated with the organization. For example, self-service kiosk inventory control computing platform 110, internal entity computing system 120, and/or self-service kiosks 130a-130n may be associated with an enterprise organization (e.g., a financial institution), and network 190 may be associated with and/or operated by the organization, and may include one or more networks (e.g., LANs, WANs, virtual private networks (VPNs), or the like) that interconnect self-service kiosk inventory control computing platform 110, internal entity computing system 120, self-service kiosk 130a-130n and one or more other computing devices and/or computer systems that are used by, operated by, and/or otherwise associated with the organization.

Referring to FIG. 1B, self-service kiosk inventory control computing platform 110 may include one or more processors 111, memory 112, and communication interface 113. A data bus may interconnect processor(s) 111, memory 112, and communication interface 113.

Communication interface 113 may be a network interface configured to support communication between self-service kiosk inventory control computing platform 110 and one or more networks (e.g., network 190, or the like). Memory 112 may include one or more program modules having instructions that when executed by processor(s) 111 cause self-service kiosk inventory control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of self-service kiosk inventory control computing platform 110 and/or by different computing devices that may form and/or otherwise make up self-service kiosk inventory control computing platform 110.

For example, memory 112 may have, store and/or include registration module 112a. Registration module 112a may store instructions and/or data that may cause or enable the self-service kiosk inventory control computing platform 110 to receive registration data from a plurality of self-service kiosks 130a-130n. The registration data may include location of the self-service kiosk 130, capacity, service schedule, or the like.

Self-service kiosk inventory control computing platform 110 may further have, store and/or include note identifier data module 112b. Note identifier data module 112b may store instructions and/or data that may cause or enable the self-service kiosk inventory control computing platform 110 to store note identifiers received during a loading process, during transactions performed by the self-service kiosk 130, or the like. The note identifier data may include a serial number captured from the note of currency, a denomination, or the like.

Self-service kiosk inventory control computing platform 110 may further have, store and/or include triggering event module 112c. Triggering event module 112c may store instructions and/or data that may cause or enable the self-service kiosk inventory control computing platform 110 to monitor the plurality of registered self-service kiosks for occurrence of a triggering event. If a triggering event is detected, reconciliation module 112d of self-service kiosk inventory control computing platform 110 may initiate a reconciliation or auditing process at the self-service kiosk. For instance, self-service kiosk inventory control computing platform 110 (e.g., via reconciliation module 112d) may generate an instruction or command causing the self-service kiosk 130 to initiate a rescan of all notes in the self-service kiosk 130 at the current time. The note identifiers for each note may be captured during the rescan and received by the self-service kiosk inventory control computing platform 110. The reconciliation module 112d may compare the note identifiers captured via rescan to the note identifiers received during loading and/or transactions to determine whether the expected notes are in the self-service kiosk 130 (e.g., based on the note identifier).

Self-service kiosk inventory control computing platform 110 may further have, store and/or include note analysis module 112e. Note analysis module 112e may store instructions and/or data that may cause or enable the self-service kiosk inventory control computing platform 110 to evaluate note data received by the self-service kiosk inventory control computing platform 110 from the plurality of self-service kiosks 130a-130n to determine whether the notes meet criteria for removal from circulation. For instance, if the note identifier indicates the printing date of the note was equal to or greater than a threshold time ago, the note may be flagged for removal from circulation and transferred to a holding area within the self-service kiosk 130.

Self-service kiosk inventory control computing platform 110 may further have, store and/or include device service module 112f. Device service module 112f may store instructions and/or data that may cause or enable self-service kiosk inventory control computing platform 110 to analyze triggering events, results of note analysis, results of reconciliation, or the like, and generate a request for service for the self-service kiosk 130. In some examples, device service module 112f may transmit or send the request for service to, for instance, internal entity computing system 120, to dispatch and/or coordinate service.

Self-service kiosk inventory control computing platform 110 may further have, store and/or include machine learning engine 112g. Machine learning engine 112g may store instructions and/or data that may cause or enable the self-service kiosk inventory control computing platform 110 to train, execute, validate and/or update one or more machine learning models that may be used to determine when a self-service kiosk 130 should be serviced, evaluate inventory levels within a self-service kiosk to identify combinations of notes available to dispense to a user, or the like. In some examples, the machine learning model may be trained (e.g., using historical data related to self-service kiosk service schedules, inventories within self-service kiosks when service was performed, combinations of denominations of notes dispensed to users or requested by users from a self-service kiosk, or the like) to identify patterns or sequences in data that indicate or output when a self-service kiosk should be serviced, combinations of denominations to fulfill a withdrawal request, or the like. The machine learning model may, in some arrangements, use as inputs current inventory, current note identifier data, recent reconciliation data, or the like and, based on execution of the model, output a recommendation to service a self-service kiosk, output a combination of notes to provide to a user, or the like. In some examples, the machine learning model may be or include one or more supervised learning models (e.g., decision trees, bagging, boosting, random forest, neural networks, linear regression, artificial neural networks, logical regression, support vector machines, and/or other models), unsupervised learning models (e.g., clustering, anomaly detection, artificial neural networks, and/or other models), knowledge graphs, simulated annealing algorithms, hybrid quantum computing models, and/or other models.

Self-service kiosk inventory control computing platform 110 may further have, store, and/or include database 112h. Database 112h may store data related to note identifiers, inventory data, historical data, and the like.

Figure 2:
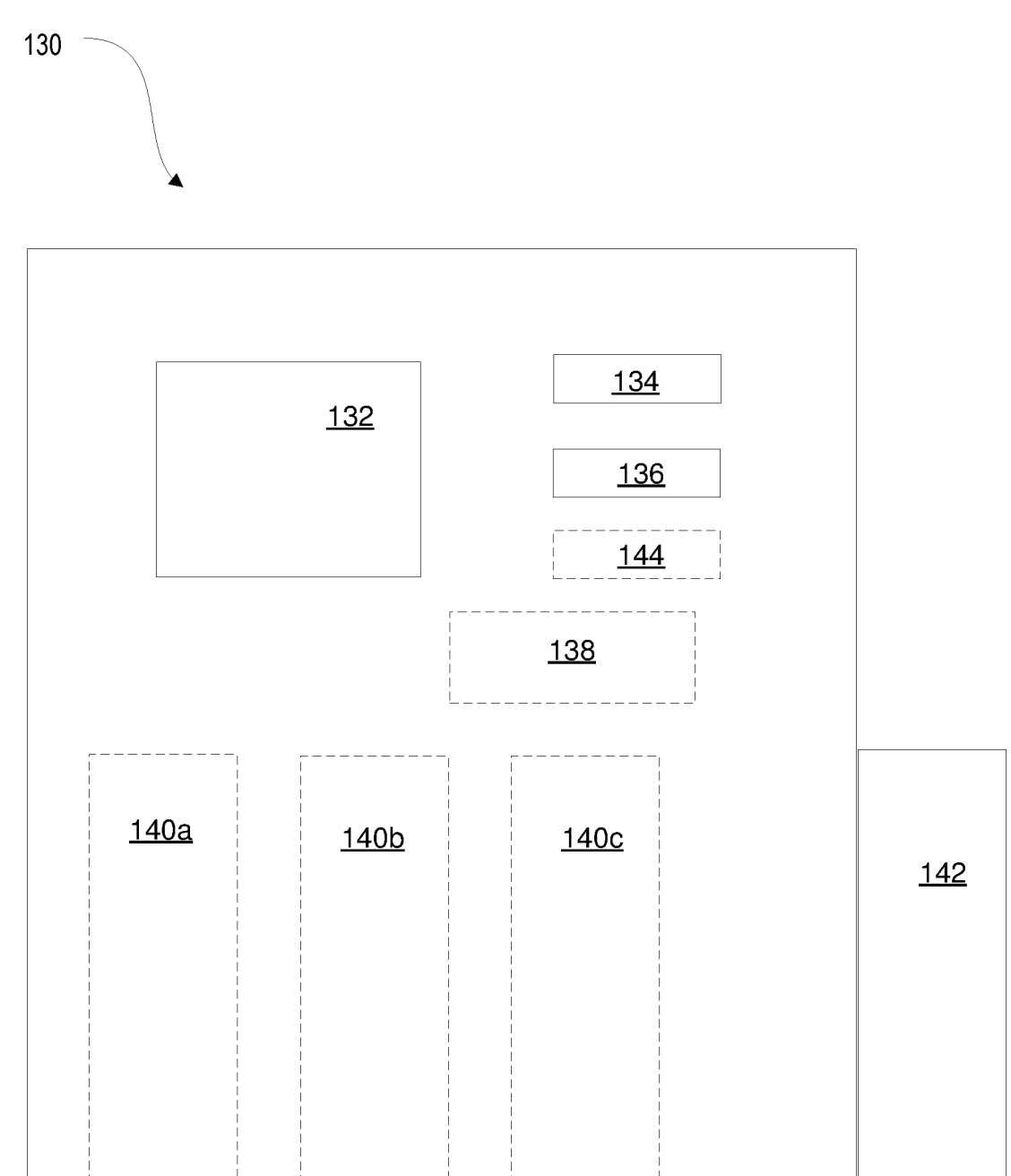

FIG. 2 illustrates one example self-service kiosk 130 that may be used in conjunction with aspects described herein and may represent any one of self-service kiosk 130a-130n. The self-service kiosk 130 may include a display 132 that may be a touchscreen display, may include one or more keys including a keypad, selection keys, or the like, one or more soft keys, and the like. The display 132 may display one or more user interfaces that the user may interact with to request and process transactions, such as withdrawals, deposits, or the like.

Self-service kiosk may further include a deposit slot or receptacle 134 configured to receive one or more deposit items, such as notes of currency, checks, or the like during a deposit transaction. Self-service kiosk 130 may further include a dispensing slot or receptacle 136 configured to dispense notes of currency from the self-service kiosk during a withdrawal transaction.

Self-service kiosk 130 may further include a scanning or image capture device 144. Scanning or imaging device may include various types of image capture devices or scanning devices to capture, for instance, an image of each note received by or dispensed from the self-service kiosk 130 and/or to capture note image data including note identifiers during a rescan for a reconciliation or audit process. The image capture device 144 may be arranged on an interior of the self-service kiosk and may scan or image notes when they are received during a loading or stocking process, when received through a deposit transaction, when dispensed during a withdrawal transaction, and the like. The image capture device 144 may capture images including a note identifier, such as a serial number, which may be retrieved or extracted from image data captured by the image capture device 144 through optical character recognition, object identification processing, or the like. Images and/or data captured by the image capture device 144 may be transmitted to and/or stored by self-service kiosk inventory control computing platform 110.

Self-service kiosk 130 may further include a temporary holding area 138 on an interior of the self-service kiosk 130. The temporary holding area 138 may include a storage device configured to hold notes identified for removal from circulation, notes received via a deposit process that may be dispensed to another user, notes that may be used to restock one or more storage cassettes 140a-140c, or the like.

Self-service kiosk 130 may include a plurality of storage cassettes 140a-140c. Although three storages cassettes are shown, more or fewer cassettes may be used without departing from the invention. The cassettes 140a-140c may store notes of currency that may be dispensed to users during a withdrawal transaction. In some examples, each cassette may store a single denomination of notes (e.g., cassette 140a may store $5 notes, cassette 140b may store $20 notes, cassette 140c may store $50 notes, or the like). Additionally or alternatively, the cassettes 140a-140c may store a mix or combination of denominations of notes. By scanning each note to understand how many notes of each denomination are available, mixed denomination cassettes may be used to improve efficiency.

In some examples, one cassette, for instance 140c, may be an empty cassette used to facilitate rescan of the notes during a reconciliation or audit process. For instance, notes may be removed from cassettes 140a and 140b (e.g., active cassettes for use in processing transactions), scanned and stored (e.g., temporarily) in cassette 140c as the notes are being scanned, counted, reconciled, or the like. Additionally or alternatively, self-service kiosk 130 may include an additional storage device 142 that may be internal to the self-service kiosk 130 or external to the self-service kiosk 130 (shown in FIG. 2 as a non-limiting example). Notes may be rescanned and transferred to storage device 142 during a rescan or reconciliation process.

FIGS. 3A-3G depict one example illustrative event sequence for implementing self-service kiosk inventory control functions in accordance with one or more aspects described herein. The events shown in the illustrative event sequence are merely one example sequence and additional events may be added, or events may be omitted, without departing from the invention. Further, one or more processes discussed with respect to FIGS. 3A-3G may be performed in real-time or near real-time.

Figure 3A:
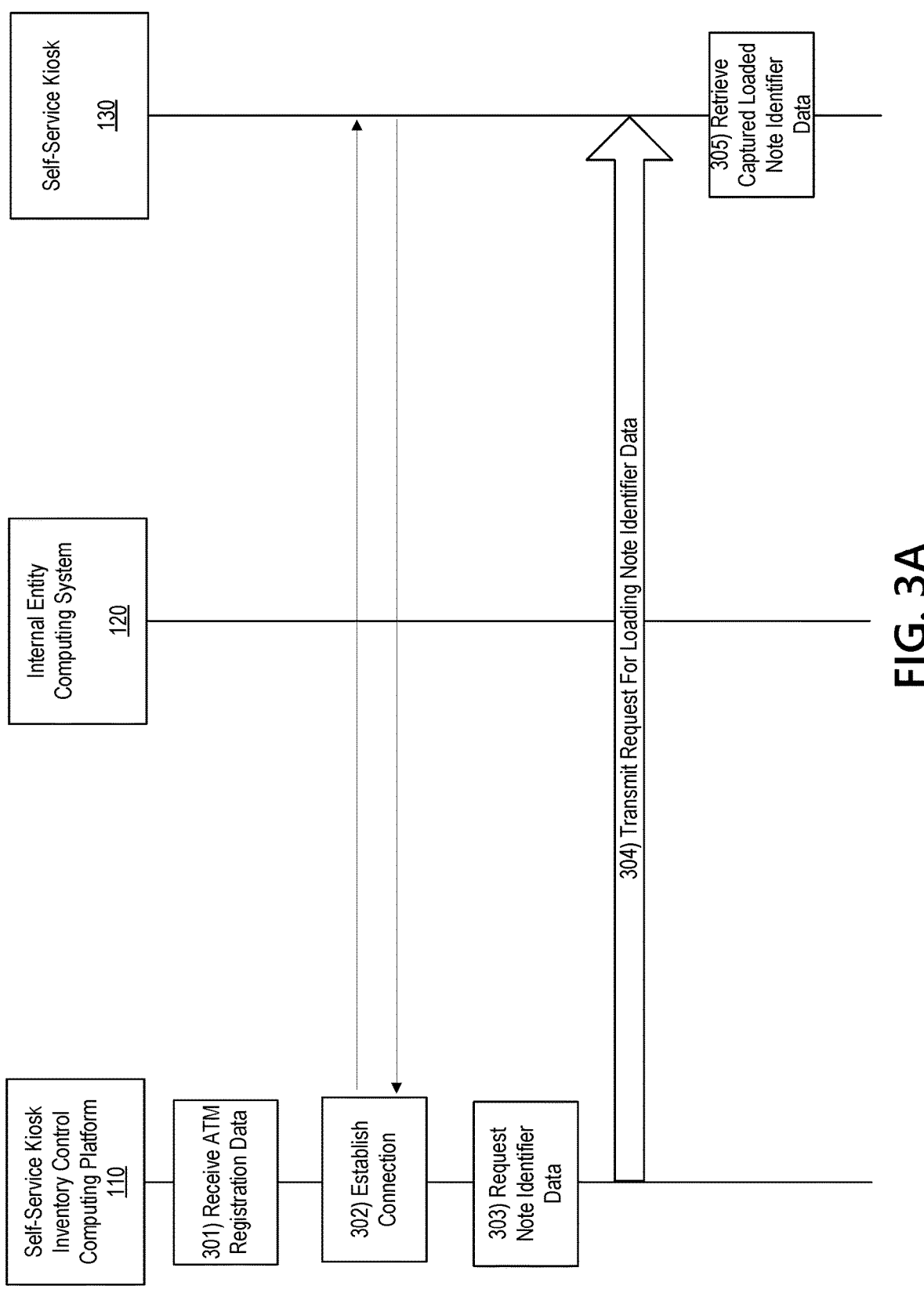
FIGS. 3A-3G depict an illustrative event sequence for implementing self-service kiosk inventory control functions in accordance with one or more aspects described herein.

With reference to FIG. 3A, at step 301, self-service kiosk inventory control computing platform 110 may receive registration data from a plurality of self-service kiosks 130a-130c. In some examples, the registration information may include a location of the self-service kiosk, a service schedule, capacity, and the like.

At step 302, self-service kiosk inventory control computing platform 110 may connect to a first self-service kiosk, such as self-service kiosk 130. For instance, a first wireless connection may be established between self-service kiosk inventory control computing platform 110 and self-service kiosk 130. Upon establishing the first wireless connection, a communication session may be initiated between self-service kiosk inventory control computing platform 110 and self-service kiosk.

At step 303, a request for note identifier data may be generated by the self-service kiosk inventory control computing platform 110. For instance, a request for the self-service kiosk to capture note identifier data for notes of currency received during a loading or servicing process, received or dispensed during transactions such as withdrawals and deposits, and the like.

At step 304, the request for note identifier data may be transmitted or sent by the self-service kiosk inventory control computing platform 110 to the self-service kiosk 130. In some examples, the request for note identifier data may be transmitted or send during the communication session initiated upon establishing the first wireless connection.

At step 305, self-service kiosk 130 may receive the request and execute the request. Executing the request may include retrieving note identifier data captured (e.g., by image capture device 144) during a loading process, received from the enterprise organization during the loading process, or may include capturing the note identifier data as notes are loaded into the self-service kiosk 130.

Figure 3B:
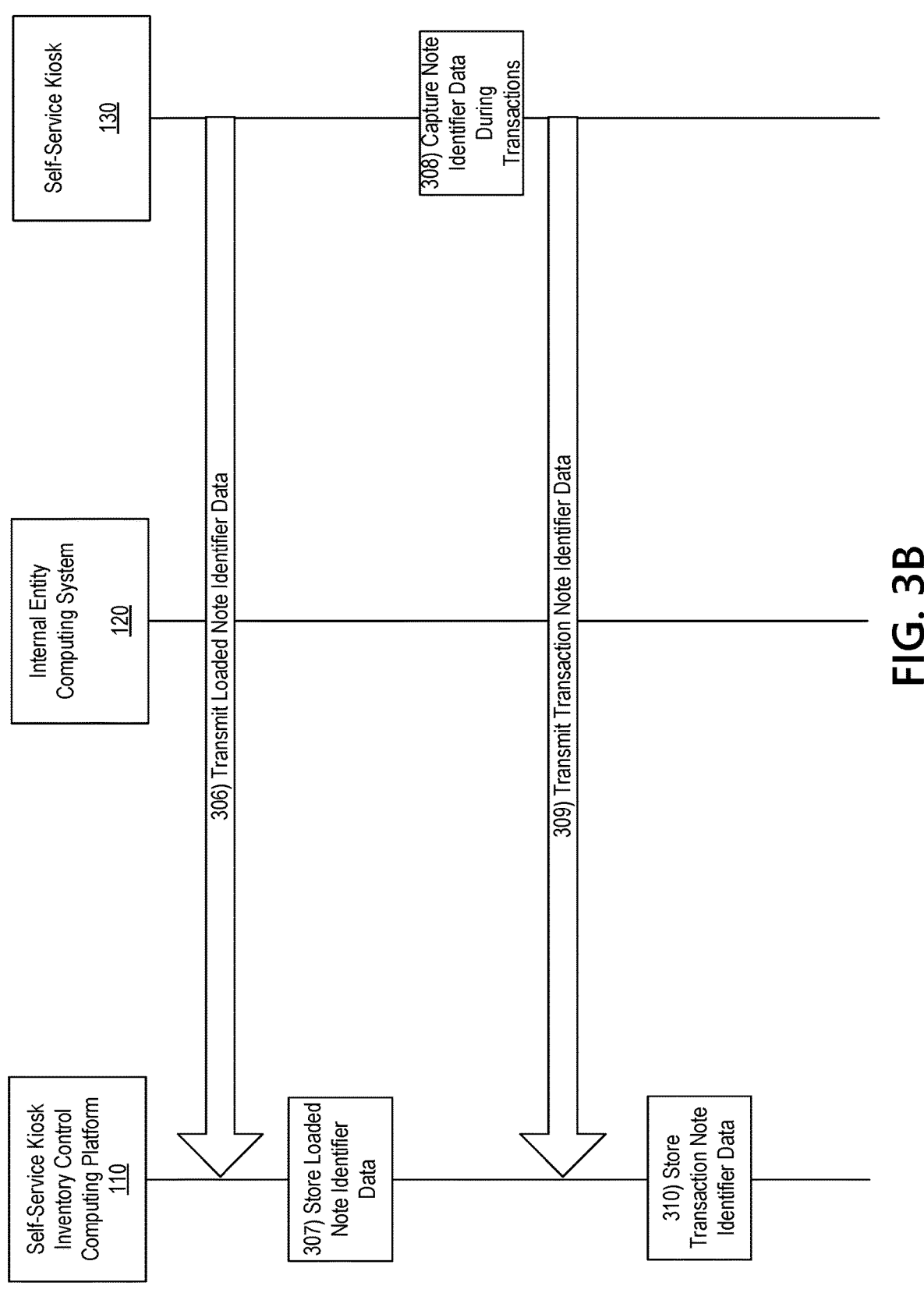

With reference to FIG. 3B, at step 306, the loaded note identifier data may be transmitted or sent by the self-service kiosk 130 to the self-service kiosk inventory control computing platform 110. At step 307, the loaded note identifier data may be stored by the self-service kiosk inventory control computing platform 110.

At step 308, executing the request for note identifier data may also include capturing note identifier data during transactions executed by the self-service kiosk 130. Accordingly, as notes are received and/or dispensed from the self-service kiosk 130, image capture device 144 may capture image data and/or note identifier data for each note received or dispensed. At step 309, the transaction note identifier data may be transmitted or sent by the self-service kiosk 130 to the self-service kiosk inventory control computing platform 110. In some examples, the transaction note identifier data may be sent in real-time as transactions are processed by the self-service kiosk 130. Additionally or alternatively, the transaction note identifier data may be transmitted in batches on a predetermined schedule, after a predetermined time as elapsed, or the like.

At step 310, self-service kiosk inventory control computing platform 110 may receive the transaction note identifier data and may store the transaction note identifier data.

Figure 3C:
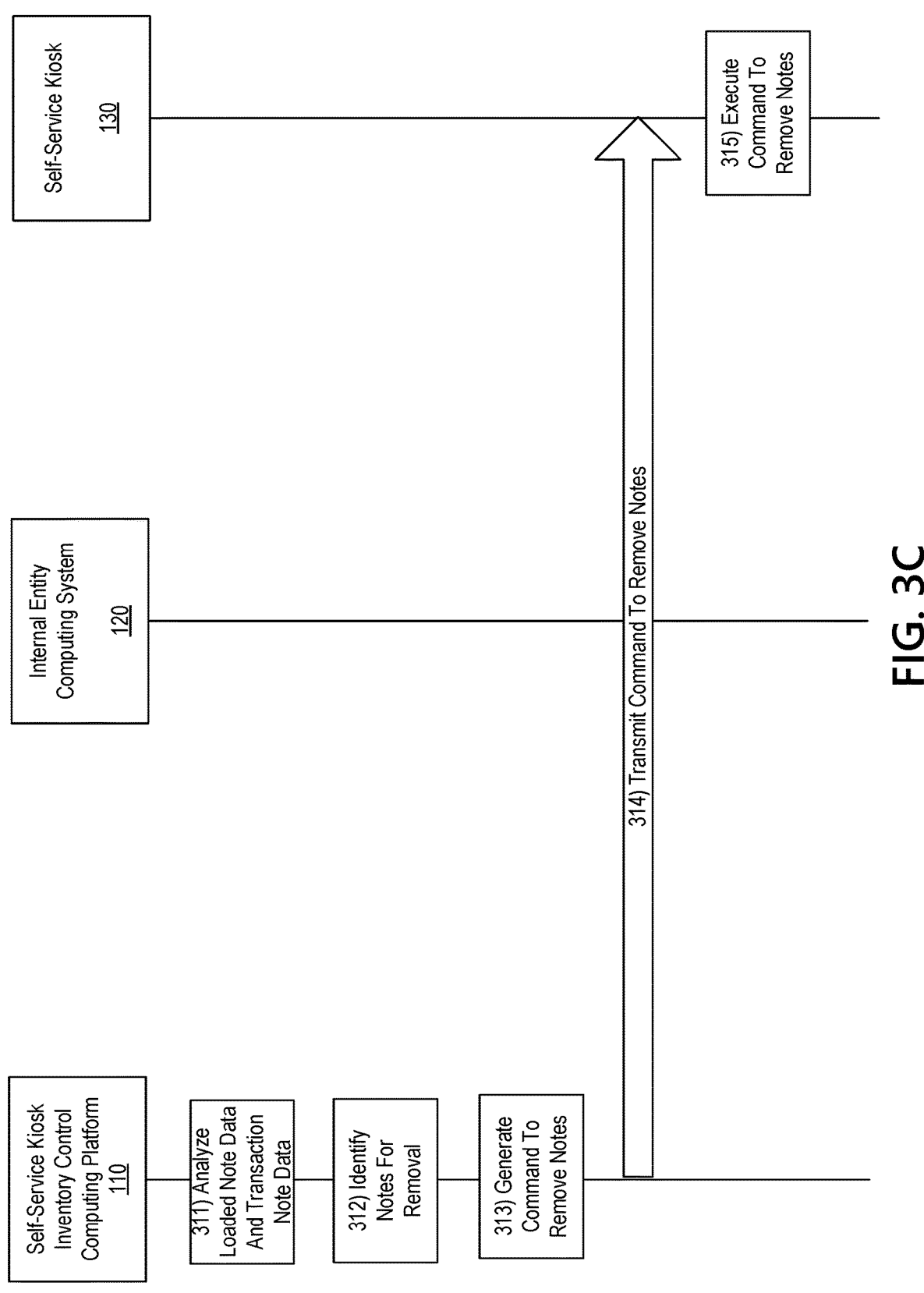

With reference to FIG. 3C, at step 311 the loaded note data identifiers and transaction data identifiers may be analyzed to determine whether one or more notes should be removed from circulation. For instance, based on the note identifiers associated with each note, a time in circulation may be determined for each note. If the time in circulation is greater than or equal to a threshold, the note may be identified for removal from circulation at step 312. In some examples, analyzing the note identifiers may include comparing the note identifiers to a list of notes to be removed from circulation (e.g., a list provided by a government entity or other entity). If the note identifier matches a note identifier on the list, the note may be identified for removal from circulation.

At step 313, if one or more notes are identified for removal from circulation, self-service kiosk inventory control computing platform 110 may generate a command or instruction causing the self-service kiosk to remove the note(s) from circulation. At step 314, the self-service kiosk inventory control computing platform 110 may transmit or send the generated command or instruction to the self-service kiosk 130.

At step 315, self-service kiosk 130 may receive and execute the command to remove the identified note(s) from circulation. For instance, executing the command may cause the self-service kiosk 130 to transfer the note(s) from a current location (e.g., a cassette 140a-140c) to a temporary storage or holding location within the self-service kiosk 130 (e.g., temporary holding area 138) until the note(s) are removed from the self-service kiosk 130 and removed from circulation (e.g., destroyed, returned to the government, or the like).

Figure 3D:
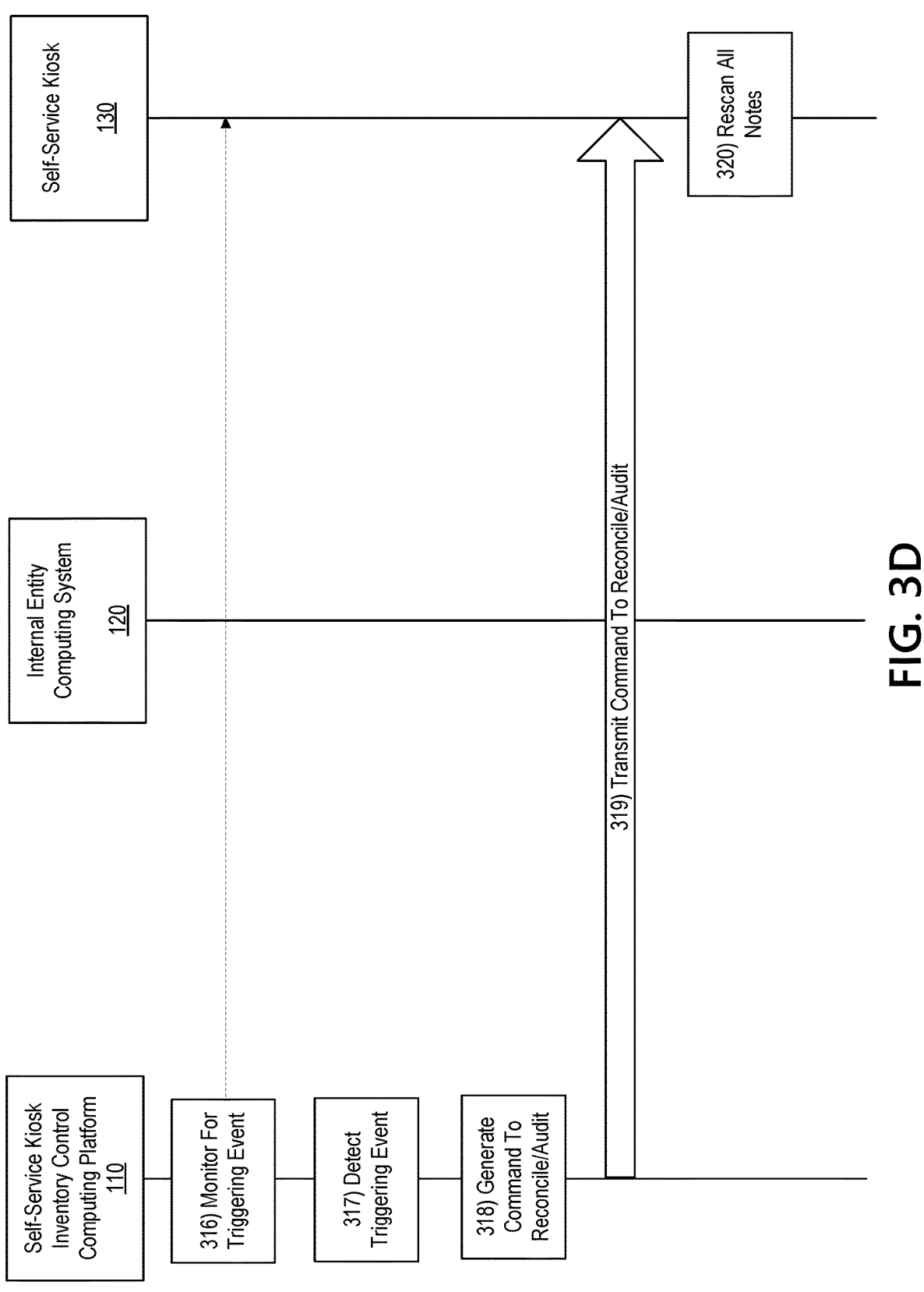
Figure 3E:
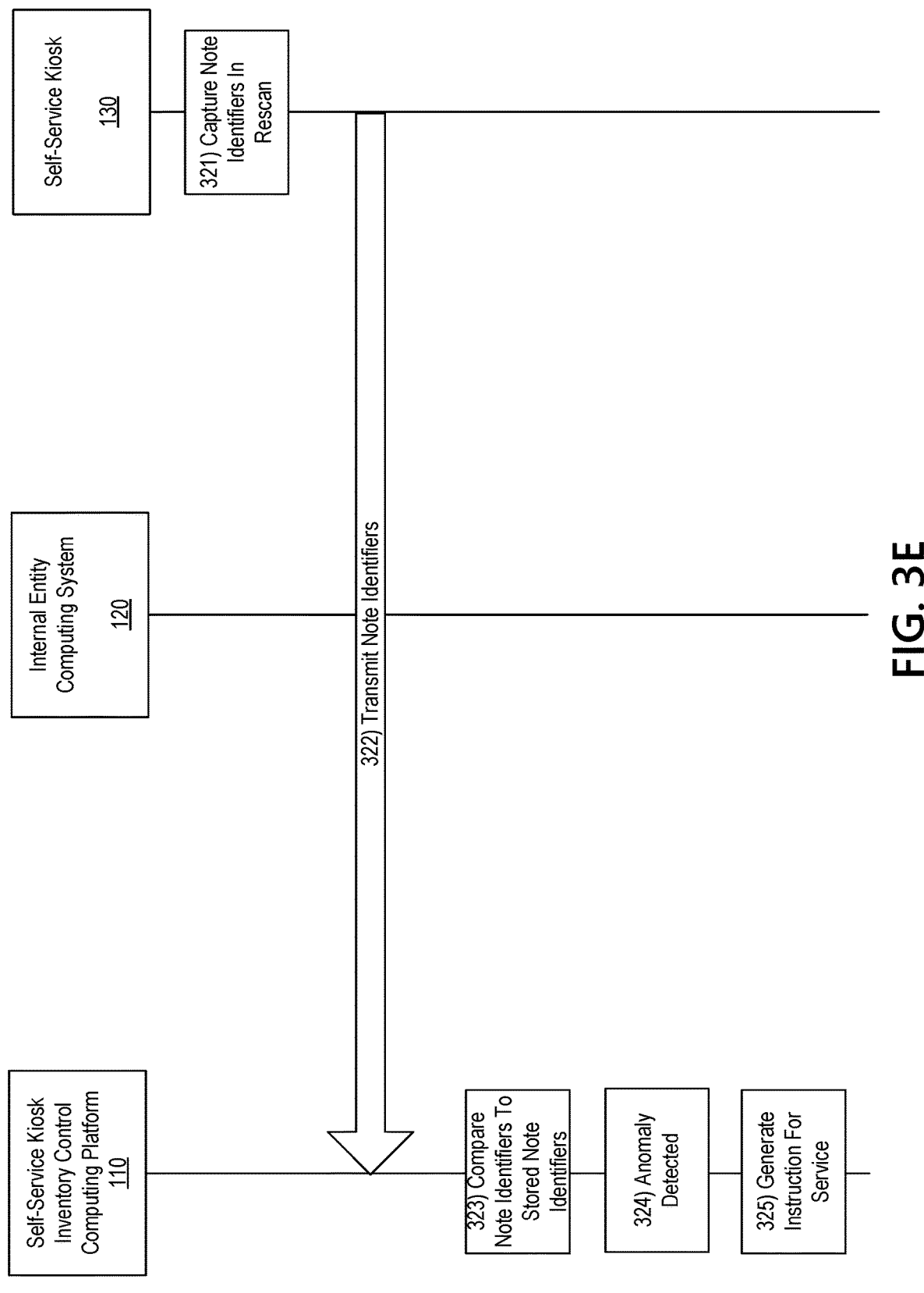

With reference to FIG. 3D, at step 316, self-service kiosk inventory control computing platform 110 may monitor one or more self-service kiosks (e.g., registered kiosks) for a triggering event. For instance, self-service kiosk inventory control computing platform 110 may monitor a time in service to determine whether a self-service kiosk has been in service for at least a threshold amount of time. If so, a triggering event may be detected. In another example, a self-service kiosk may indicate a mechanical malfunction, a low inventory, or the like, that may cause a triggering event to be detected. In some examples, a triggering event may be a predetermined time, day or the like, such that a triggering event is detected on a scheduled periodic or aperiodic basis. Various other triggering events may be used without departing from the invention.

At step 317, a triggering event may be detected by the self-service kiosk inventory control computing platform 110 for one or more self-service kiosks 130. In response to detecting the triggering event, at step 318, a command or instruction to initiate a reconciliation or audit process may be generated by the self-service kiosk inventory control computing platform 110.

At step 319, the generated command or instruction to initiate the reconciliation or audit process may be transmitted or sent to the self-service kiosk 130. In some examples, transmitting the command or instruction may cause the self-service kiosk 130 to execute the command and initiate the reconciliation or audit process.

At step 320, self-service kiosk 130 may receive and execute the command which may cause a rescan of all notes within the self-service kiosk at a current time. Accordingly, notes currently within the self-service kiosk 130 may be rescanned to obtain note identifiers for each note currently within the self-service kiosk 130 at step 321 in FIG. 3E. As discussed herein, in some examples, rescanning the notes may cause the notes to be transferred from a current cassette 140a-140c to another cassette 140a-140c and/or to another storage device, such as device 142. For instance, each note may be removed from a current location, scanned or otherwise imaged (e.g., via image capture device 144) and transferred to another location within the self-service kiosk until the reconciliation process is complete.

At step 322, self-service kiosk 130 may transmit or send the note identifiers captured in the rescan to the self-service kiosk inventory control computing platform 110.

At step 323, self-service kiosk inventory control computing platform 110 may receive the note identifiers captured during the rescan and compare them to the note identifiers received from a loading process and from one or more transactions (e.g., notes received in deposits and dispensed in withdrawals). This comparison may be a self-audit or self-reconciliation for the self-service kiosk 130 in that it enables the self-service kiosk to confirm accuracy of inventory data, transaction accuracy, and the like.

If the reconciliation process is successful, a notification, such as user interface 500 in FIG. 5 may be generated and transmitted to a device for display (e.g., an administrator computing device, internal entity computing system 120, or the like). If the reconciliation process is not successful, a notification such as user interface 600 may be generated and transmitted to the device for display. Both user interfaces 500 and 600 identify a result of the reconciliation process, a location of the self-service kiosk evaluated, number or identifier of the self-service kiosk, and the like. Interface 600 may further offer a selectable option to view additional information associated with the failure, such as a reconciliation failure report.

At step 324, if an anomaly is detected in the comparing performed at step 323, an instruction for service may be generated at step 325. The instruction for service may include an identification of the self-service kiosk in need of service, a location of the self-service kiosk, a potential issue, or the like.

In some examples, machine learning may be used to determine whether service should be dispatched to the self-service kiosk. For instance, a machine learning model may receive, as inputs, data associated with the reconciliation process, the identified anomaly, and the like. The machine learning model may be executed to output a decision of whether service is recommended. If so, the instruction for service may be generated at step 325.

Figure 3F:
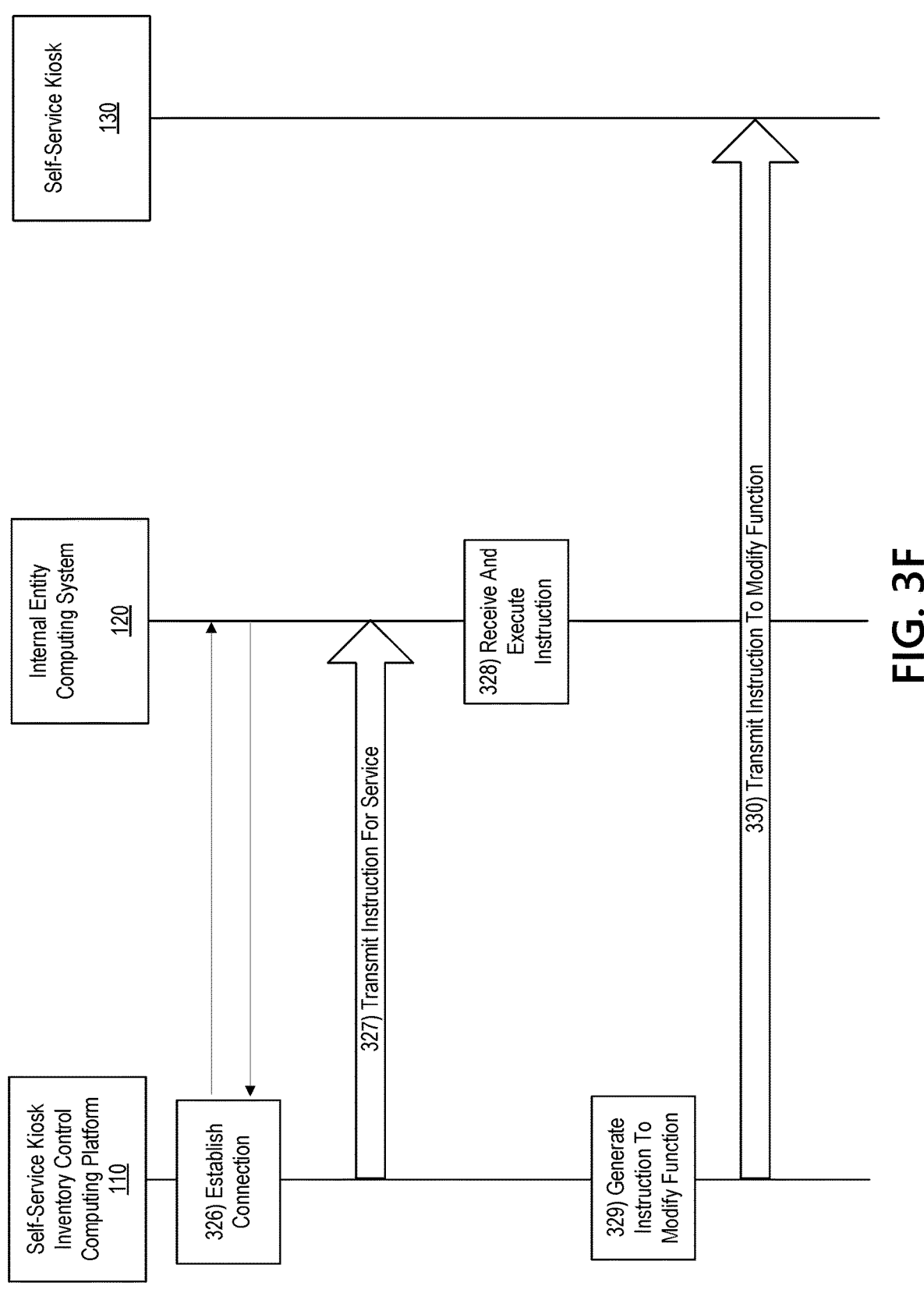

With reference to FIG. 3F, at step 326, self-service kiosk inventory control computing platform 110 may connect to internal entity computing system 120. For instance, a second wireless connection may be established between self-service kiosk inventory control computing platform 110 and internal entity computing system 120. Upon establishing the second wireless connection, a communication session may be initiated between self-service kiosk inventory control computing platform 110 and internal entity computing system 120.

At step 327, the self-service kiosk inventory control computing platform 110 may transmit or send the instruction to initiate service to the internal entity computing system 120. For instance, the instruction or command may be sent during the communication session initiated upon establishing the second wireless connection.

At step 328, internal entity computing system 120 may receive and execute the instruction to initiate service. For instance, a technician or other service provider may be dispatched to the identified self-service kiosk 130.

In some examples, based on an anomaly being detected or service being needed, self-service kiosk inventory control computing platform 110 may generate an instruction modifying functionality of the self-service kiosk at step 329. For instance, based on a type of anomaly, scheduled service, or the like, self-service kiosk inventory control computing platform 110 may generate an instruction limiting or reducing operations available to users at the self-service kiosk 130. For instance, in some examples, the instructions may cause the self-service kiosk to provide withdrawal transactions but may disable deposit functionality. Various other functional modifications may be performed or executed without departing from the invention.

At step 330, self-service kiosk inventory control computing platform 110 may transmit the instruction to modify the functionality to the self-service kiosk 130.

Figure 3G:
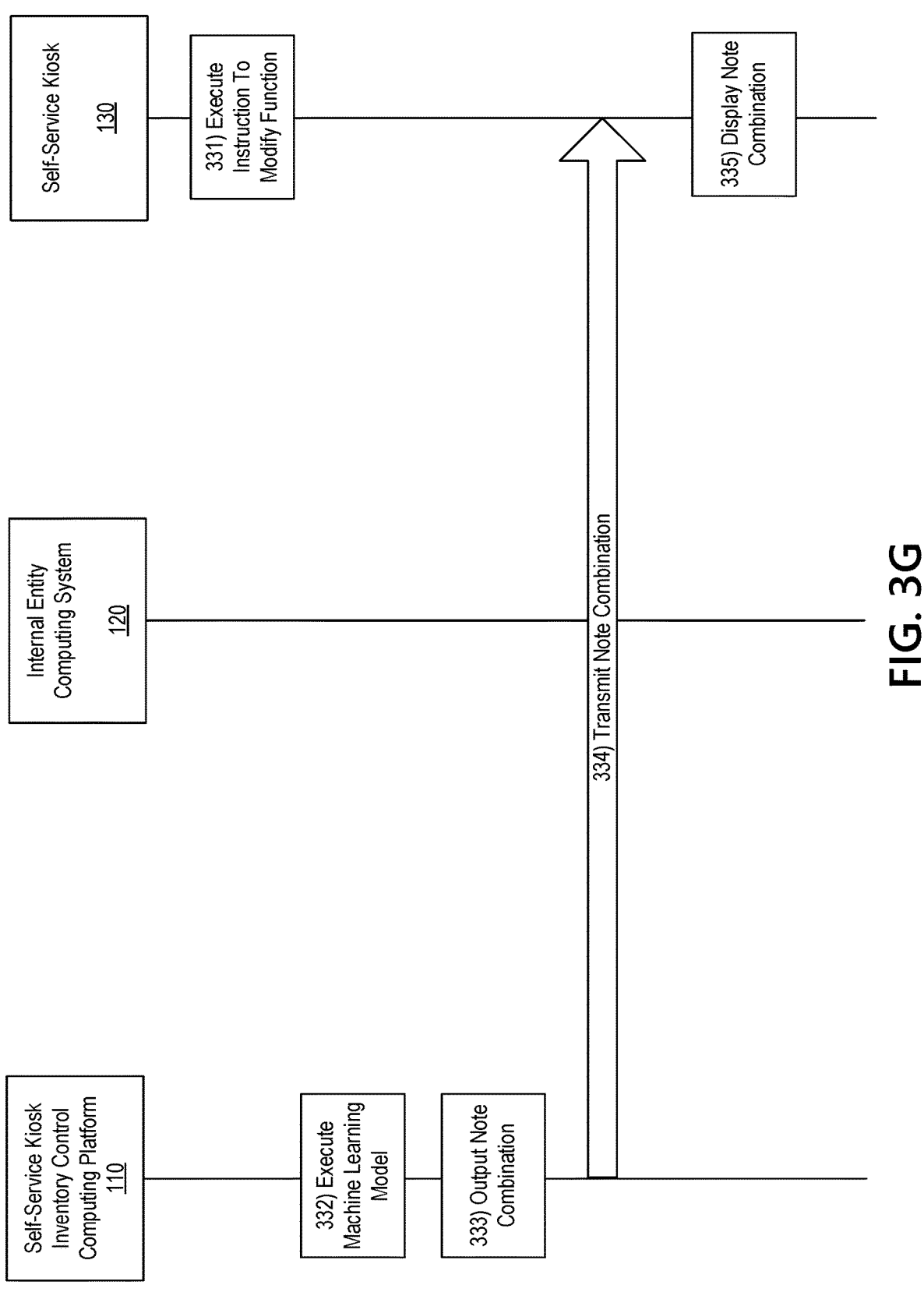

With reference to FIG. 3G, at step 331, self-service kiosk 130 may receive and execute the command, thereby causing the self-service kiosk 130 to modify functionality available to users. In some examples, modifying functionality may include modifying one or more user interfaces displayed to users to indicate that one or more functions are unavailable (e.g., gray out the option) or remove options for certain functions from one or more user interfaces.

As discussed herein, a machine learning model may be used to generate one or more outputs associated with the self-service kiosk. In some examples, the machine learning model may receive, as inputs, the note data from the reconciliation process (e.g., notes dispensed, notes available, and the like) and may, based on execution of the model, output one or more recommended combinations of notes for dispensing to a requesting user (e.g., based on the available denominations of notes as determined from the inventory data obtained during the reconciliation process).

For instance, at step 332, the machine learning model may receive the note reconciliation data (e.g., note identifiers and/or denominations present and available for use in the self-service kiosk (e.g., not identified to be removed from circulation)). The machine learning model receive this data as inputs and, based on execution of the model, may output one or more note combinations at step 333. For instance, one or more recommended combinations of denominations may be identified to fulfill commonly requested amounts for withdrawal (e.g., $200, $250, $100, or the like). For instance, based on the note inventory data input to the model, the model may output a recommendation to offer any user requesting $200 a combination of one $50 dollar note, 6 $20 dollar notes, and 6 $5 dollar notes. The recommendation may be based on real-time availability of notes determined from the reconciliation process. Various other recommended combinations may be generated without departing from the invention.

At step 334, the recommended combinations may be transmitted by the self-service kiosk inventory control computing platform 110 to the self-service kiosk 130. In some examples, transmitting the recommended combinations may cause the self-service kiosk 130 to display the combinations as an offer to a requesting user (e.g., in response to a user requesting to withdraw $200, the self-service kiosk 130 may display an option to receive the recommended combination).

At step 335, the self-service kiosk 130 may display the recommended combination as an offer to a user. In displaying the recommended combination, the user may select an option to proceed with the recommended combination or receive another combination (e.g., a standard or default combination, a customized combination, or the like).

Figure 4:
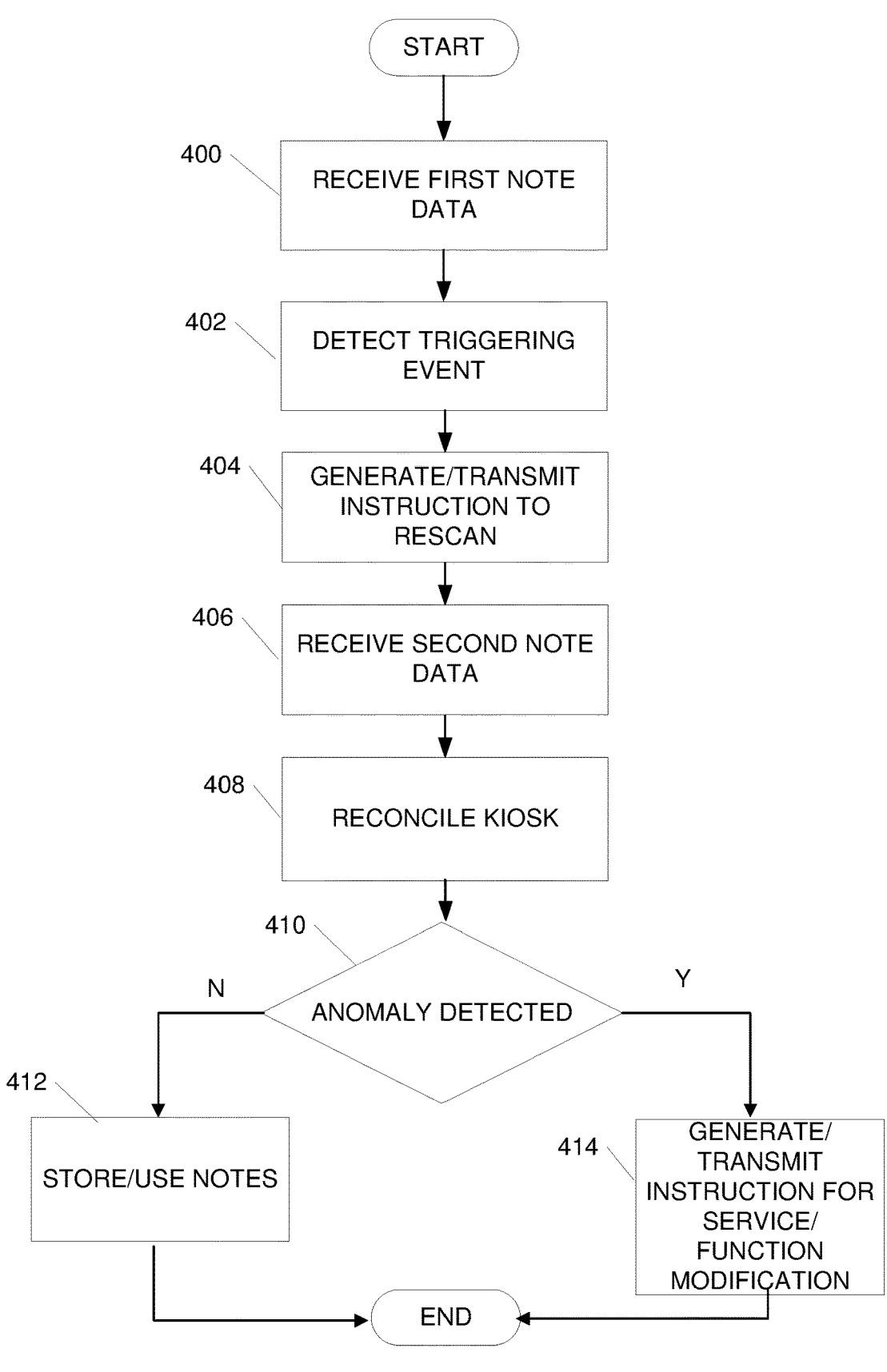
FIG. 4 illustrates and illustrative method for implementing self-service kiosk inventory control functions according to one or more aspects described herein.

FIG. 4 is a flow chart illustrating one example method of implementing self-service kiosk inventory control functions in accordance with one or more aspects described herein. The processes illustrated in FIG. 4 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 4 may be performed in real-time or near real-time.

At step 400, first note data may be received by a computing platform from a self-service kiosk. The first note data may be data associated with a plurality of notes of currency associated with the self-service kiosk and may include a first plurality of note identifiers. In some examples, the first plurality of note identifiers may include a note identifier, such as a serial number of a note of currency, associated with each note received by the self-service kiosk and dispensed by the self-service kiosk. In some examples, the first note data may be captured for notes associated with the self-service kiosk for a particular time period (e.g., since a resent reload or rebalance of the self-service kiosk, since a service call, or the like).

In some arrangements, receiving the first note data may include receiving note identifiers capturing during a loading or stocking process of the self-service kiosk (e.g., one or more cassettes are replenished, replaced, or the like and note identifiers are captured). In some examples, receiving the first note data may include receiving note identifiers capturing during one or more transaction processes. For instance, as notes are deposited, deposit note identifiers may be captured. As notes are withdrawn, withdrawal note identifiers may be captured.

In some examples, notes received by the self-service kiosk may be analyzed to determine whether each note should be removed from circulation. for instance, a time in circulation may be determined for each note based on the note identifier. In some examples, the time in circulation may be compared to a threshold time. If the time in circulation for a note is equal to or greater than the threshold time, the note may be transferred to a temporary storage location to be removed from the self-service kiosk 130 and circulation. If the time in circulation is less than the threshold, the note may be placed in active use in the self-service kiosk 130 (e.g., placed in a cassette for dispensing).

At step 402, the computing platform may detect a triggering event. For instance, an inventory trigger may be received, a predetermined period of time may have elapsed, or the like.

At step 404, responsive to detecting the triggering event, the computing platform 110 may generate an instruction to capture second note data for all notes currently within the self-service kiosk at a current time. The computing platform 110 may transmit or send the instruction to the self-service kiosk 130 which may cause the self-service kiosk to initiate a rescan function to capture a second plurality of note identifiers including a note identifier associated with each note currently within the self-service kiosk at the current time.

In some examples, the rescan function may include removing each note from an initial storage location, capturing a note identifier associated with a respective note, and transferring the rescanned note to a second storage location different from the initial storage location. In some examples, the second storage location may be an empty cassette included within the self-service kiosk for reconciliation purposes (e.g., to house notes during the rescan process). Additionally or alternatively, the second storage location may be an additional storage device that may be external to the self-service kiosk.

At step 406, the second note data including the second plurality of note identifiers may be received by the computing platform 110.

At step 408, the computing platform 110 may reconcile the self-service kiosk. In some examples, reconciling the self-service kiosk may include comparing the second note data to the first note data to confirm note identifiers from the first plurality of note identifiers for notes of currency expected to be within the self-service kiosk (e.g., note identifiers associated with received notes but not withdrawn notes) are present in the second note data.

At step 410, based on the reconciliation, a determination may be made as to whether any anomalies were detected. If not, at step 412, the notes may be stored and/or continue in use within the self-service kiosk 130.

If, at step 410, an anomaly is detected, at step 414, an instruction to initiate service and/or modify functionality of the self-service kiosk 130 may be generated and transmitted to, for instance, internal entity computing system 120, the self-service kiosk 130, or the like. Transmitting the instruction may cause a receiving system or device to execute the instruction, as discussed herein.

Aspects described herein are related to real-time self-service kiosk inventory management and control, as well as self-auditing or self-reconciliation processes. As discussed herein, notes may be scanned when loaded into a self-service kiosk to capture a note identifier, such as a serial number with each note being loaded. In some examples, each note may be analyzed to determine whether it has been in circulation at least a threshold amount of time (e.g., based on, for instance, printing date of the note determined from the serial number). If the note has been in circulation at least the threshold amount of time, the note may be moved to a temporary storage location for removal from the self-service kiosk and circulation. If not, the note may be loaded into a cassette of the self-service kiosk for use in transaction processed (e.g., dispensing to users requesting withdrawals).

In some examples, a government agency or entity may provide a list of notes for removal from circulation (e.g., based on note identifier). Accordingly, in capturing the note identifiers for each note, any note identified for removal from circulation may be identified and held until removed from the self-service kiosk.

While aspects described herein provide the self-service kiosk scanning each note upon receive, in some examples, the notes may be scanned at a vault or other service provider or enterprise organization location and loaded into cassettes for loading into the self-service kiosks. In those arrangements, note identifier data may be provided to the computing platform from the service provider or other entity scanning the notes.

The arrangements described herein provide for precise tracking of notes based on unique note identifiers. Accordingly, by understanding a precise location of each note within a self-service kiosk, the self-service kiosk can efficiently manage inventory, dispense funds, and the like.

Further, the precise note inventory data may be used when self-service kiosks are unloaded or rebalanced to further ensure accuracy of funds in the self-service kiosk. For instance, the inventory data may be provided to a vault or service provider for use in confirming their auditing process.

In some examples, the self-auditing or self-reconciliation functions may be performed without interruption to the service of the self-service kiosk. For instance, users may still process transactions at a self-service kiosk as the machine is self-auditing.

Further, while self-service kiosk loading or servicing is performed on a schedule, capturing and controlling real-time inventory of a self-service kiosk may enable service schedules to be extended or even eliminated. For instance, the use of machine learning and real-time inventory control may enable the computing platform to detect when service or replenishment is needed and dispatch service or replenishment, rather than having a scheduled operation.

As discussed herein, by understanding the exact number of notes of each denomination (e.g., based on the serial number) the self-service kiosk may efficiently provide recommended combinations of notes to users withdrawing funds. For instance, in some examples, when notes are received they may be held in a temporary storage area. In some examples, notes in this area may be dispensed first, before notes in a cassette, thereby further extending time between service of the self-service kiosk.

The system may also understand exactly which notes of which denomination have been received and, in dispensing notes, may provide a recommendation for a combination to a user. In some examples, the recommended combination may be based on denomination of notes and/or number of notes of a particular denomination in the holding area (e.g., as determined from note identifier scanning). Accordingly, the system may recommend a combination that could be dispensed from the holding area without accessing cassettes. The user may then accept or decline the combination.

Figure 7:
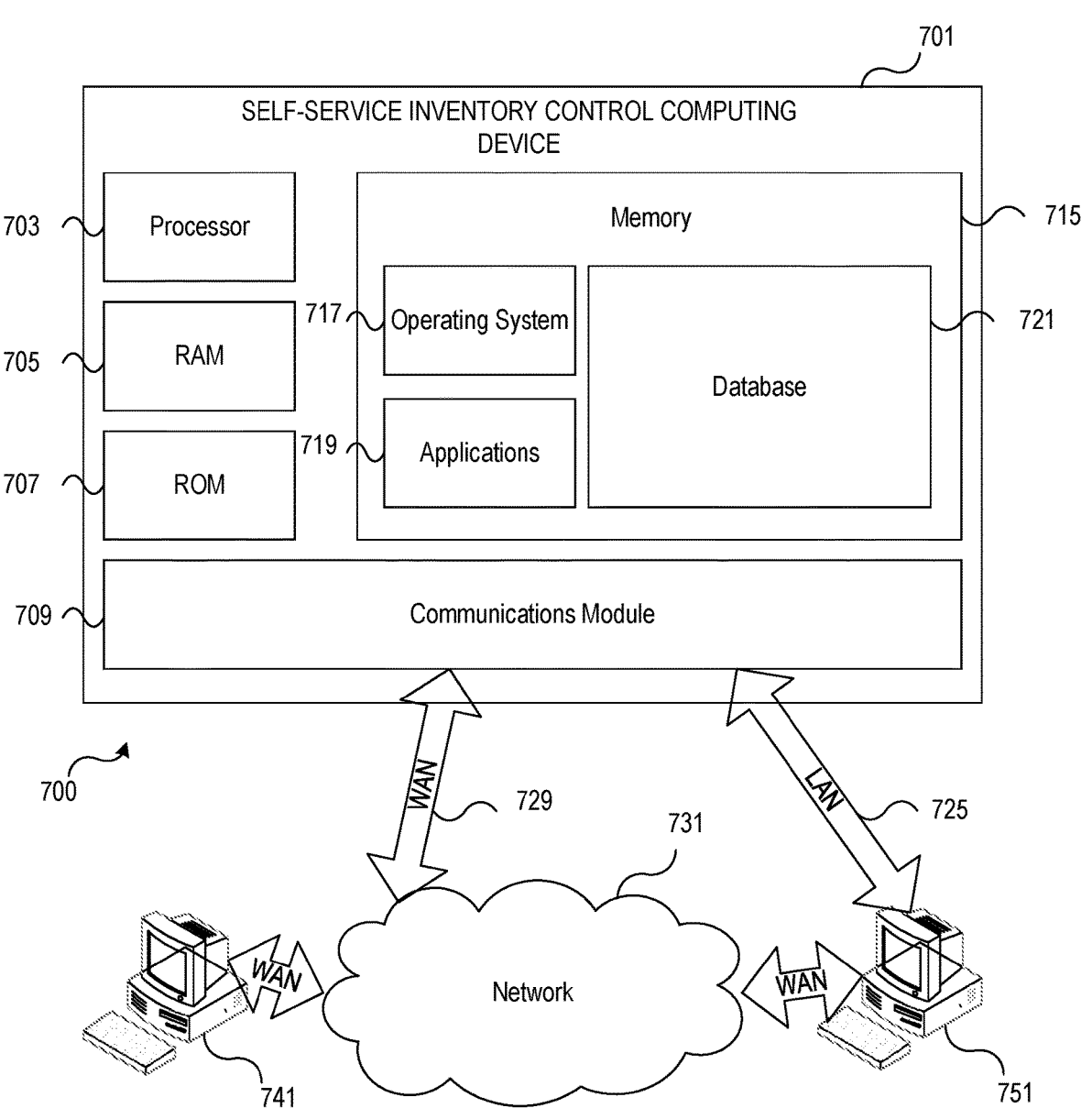
FIG. 7 illustrates one example environment in which various aspects of the disclosure may be implemented in accordance with one or more aspects described herein.

FIG. 7 depicts an illustrative operating environment in which various aspects of the present disclosure may be implemented in accordance with one or more example embodiments. Referring to FIG. 7, computing system environment 700 may be used according to one or more illustrative embodiments. Computing system environment 700 is only one example of a suitable computing environment and is not intended to suggest any limitation as to the scope of use or functionality contained in the disclosure. Computing system environment 700 should not be interpreted as having any dependency or requirement relating to any one or combination of components shown in illustrative computing system environment 700.

Computing system environment 700 may include self-service kiosk inventory control computing device 701 having processor 703 for controlling overall operation of self-service kiosk inventory control computing device 701 and its associated components, including Random Access Memory (RAM) 705, Read-Only Memory (ROM) 707, communications module 709, and memory 715. Self-service kiosk inventory control computing device 701 may include a variety of computer readable media. Computer readable media may be any available media that may be accessed by self-service kiosk inventory control computing device 701, may be non-transitory, and may include volatile and non-volatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by self-service kiosk inventory control computing device 701.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on self-service kiosk inventory control computing device 701. Such a processor may execute computer-executable instructions stored on a computer-readable medium.

Software may be stored within memory 715 and/or storage to provide instructions to processor 703 for enabling self-service kiosk inventory control computing device 701 to perform various functions as discussed herein. For example, memory 715 may store software used by self-service kiosk inventory control computing device 701, such as operating system 717, application programs 719, and associated database 721. Also, some or all of the computer executable instructions for self-service kiosk inventory control computing device 701 may be embodied in hardware or firmware. Although not shown, RAM 705 may include one or more applications representing the application data stored in RAM 705 while self-service kiosk inventory control computing device 701 is on and corresponding software applications (e.g., software tasks) are running on self-service kiosk inventory control computing device 701.

Communications module 709 may include a microphone, keypad, touch screen, and/or stylus through which a user of self-service kiosk inventory control computing device 701 may provide input, and may also include one or more of a speaker for providing audio output and a video display device for providing textual, audiovisual and/or graphical output. Computing system environment 700 may also include optical scanners (not shown).

Self-service kiosk inventory control computing device 701 may operate in a networked environment supporting connections to one or more remote computing devices, such as computing device 741 and 751. Computing devices 741 and 751 may be personal computing devices or servers that include any or all of the elements described above relative to self-service kiosk inventory control computing device 701.

The network connections depicted in FIG. 7 may include Local Area Network (LAN) 725 and Wide Area Network (WAN) 729, as well as other networks. When used in a LAN networking environment, self-service kiosk inventory control computing device 701 may be connected to LAN 725 through a network interface or adapter in communications module 709. When used in a WAN networking environment, self-service kiosk inventory control computing device 701 may include a modem in communications module 709 or other means for establishing communications over WAN 729, such as network 731 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:

at least one processor;

a communication interface communicatively coupled to the at least one processor; and a memory storing computer-readable instructions that, when executed by the at least one processor, cause the computing platform to:

receive, from a self-service kiosk, first note data associated with a plurality of notes of currency associated with the self-service kiosk, the first note data including a first plurality of note identifiers, the first plurality of note identifiers including a note identifier associated with each note received by the self-service kiosk and dispensed by the self-service kiosk;

detect a triggering event associated with the self-service kiosk, wherein the triggering event includes determining that a predetermined time period has elapsed;

responsive to detecting the triggering event, send, to the self-service kiosk, an instruction to capture second note data for all notes within the self-service kiosk at a current time, wherein sending the instruction to capture the second note data causes the self-service kiosk to initiate a rescan function to capture a second plurality of note identifiers, the second plurality of note identifiers including a note identifier for each note of the all notes within the self-service kiosk at the current time;

receive, from the self-service kiosk, the second note data;

reconcile the self-service kiosk, wherein reconciling the self-service kiosk includes comparing the second note data to the first note data to confirm note identifiers from the first plurality of note identifiers for notes of currency expected to be within the self-service kiosk are present in the second note data;

execute a machine learning model, wherein executing the machine learning model includes providing, as input, reconciliation data determined by the reconciling the self-service kiosk and including the note identifiers from the first plurality of note identifiers for notes of currency expected to be within the self-service kiosk that are present in the second note data, to output a recommended combination of notes for dispensing; and transmit, to the self-service kiosk, the recommended combination of notes for dispensing, wherein transmitting the recommended combination of notes causes the recommended combination of notes to be displayed by a display of the self-service kiosk.

2. The computing platform of claim 1, wherein the note identifiers include a serial number of a respective note of currency.

3. The computing platform of claim 1, wherein receiving, from the self-service kiosk, first note data associated with a plurality of notes of currency associated with the self-service kiosk includes:

receiving, from the self-service kiosk, loaded note identifiers captured by an image capture device of the self-service kiosk during a note loading process;

receiving, from the self-service kiosk, deposit note identifiers captured by the image capture device of the self-service kiosk as one or more notes are received during a customer deposit process; and receiving, from the self-service kiosk, withdrawal note identifiers captured by the image capture device of the self-service kiosk as one or more notes are dispensed during a customer withdrawal process.

4. The computing platform of claim 1, wherein the rescan function includes, for each note within the self-service kiosk at the current time:

removing each note from an initial storage location;

capturing a note identifier for a respective note; and transferring the respective note to a second storage location different from the initial storage location.

5. The computing platform of claim 4, wherein the second storage location is a cassette within an interior of the self-service kiosk.

6. The computing platform of claim 4, wherein the second storage location is a storage device external to the self-service kiosk.

7. The computing platform of claim 1, further including instructions that, when executed by the at least one processor, cause the computing platform to:

analyze the plurality of notes of currency associated with the self-service kiosk to determine a time in circulation for each note of currency of the plurality of notes of currency;

compare the time in circulation for a respective note of currency of the plurality of notes of currency to a threshold time;

responsive to determining that the time in circulation for the respective note of currency is less than the threshold time, storing the respective note in an active cassette within the self-service kiosk for use by the self-service kiosk; and responsive to determining that the time in circulation for the respective note of currency is equal to or greater than the threshold time, transferring the respective note of currency to a temporary storage location for removal from the self-service kiosk.

8. A method, comprising:

receiving, by a computing platform, the computing platform having at least one processor and memory, and from a self-service kiosk, first note data associated with a plurality of notes of currency associated with the self-service kiosk, the first note data including a first plurality of note identifiers, the first plurality of note identifiers including a note identifier associated with each note received by the self-service kiosk and dispensed by the self-service kiosk;

detecting, by the at least one processor, a triggering event associated with the self-service kiosk, wherein the triggering event includes determining that a predetermined time period has elapsed;

responsive to detecting the triggering event, sending, by the at least one processor and to the self-service kiosk, an instruction to capture second note data for all notes within the self-service kiosk at a current time, wherein sending the instruction to capture the second note data causes the self-service kiosk to initiate a rescan function to capture a second plurality of note identifiers, the second plurality of note identifiers including a note identifier for each note of the all notes within the self-service kiosk at the current time;

receiving, by the at least one processor and from the self-service kiosk, the second note data;

reconciling, by the at least one processor, the self-service kiosk, wherein reconciling the self-service kiosk includes comparing the second note data to the first note data to confirm note identifiers from the first plurality of note identifiers for notes of currency expected to be within the self-service kiosk are present in the second note data;

executing, by the at least one processor, a machine learning model, wherein executing the machine learning model includes providing, as input, reconciliation data determined by the reconciling the self-service kiosk and including the note identifiers from the first plurality of note identifiers for notes of currency expected to be within the self-service kiosk that are present in the second note data, to output a recommended combination of notes for dispensing; and transmitting, by the at least one processor and to the self-service kiosk, the recommended combination of notes for dispensing, wherein transmitting the recommended combination of notes causes the recommended combination of notes to be displayed by a display of the self-service kiosk.

9. The method of claim 8, wherein the note identifiers include a serial number of a respective note of currency.

10. The method of claim 8, wherein receiving, from the self-service kiosk, first note data associated with a plurality of notes of currency associated with the self-service kiosk includes:

receiving, from the self-service kiosk, loaded note identifiers captured by an image capture device of the self-service kiosk during a note loading process;

receiving, from the self-service kiosk, deposit note identifiers captured by the image capture device of the self-service kiosk as one or more notes are received during a customer deposit process; and receiving, from the self-service kiosk, withdrawal note identifiers captured by the image capture device of the self-service kiosk as one or more notes are dispensed during a customer withdrawal process.

11. The method of claim 8, wherein the rescan function includes, for each note within the self-service kiosk at the current time:

removing each note from an initial storage location;

capturing a note identifier for a respective note; and transferring the respective note to a second storage location different from the initial storage location.

12. The method of claim 11, wherein the second storage location is a cassette within an interior of the self-service kiosk.

13. The method of claim 11, wherein the second storage location is a storage device external to the self-service kiosk.

14. The method of claim 8, further including:

analyzing, by the at least one processor, the plurality of notes of currency associated with the self-service kiosk to determine a time in circulation for each note of currency of the plurality of notes of currency;

comparing, by the at least one processor, the time in circulation for a respective note of currency of the plurality of notes of currency to a threshold time;

responsive to determining that the time in circulation for the respective note of currency is less than the threshold time, storing the respective note in an active cassette within the self-service kiosk for use by the self-service kiosk; and responsive to determining that the time in circulation for the respective note of currency is equal to or greater than the threshold time, transferring the respective note of currency to a temporary storage location for removal from the self-service kiosk.

15. One or more non-transitory computer-readable media storing instructions that, when executed by a computing platform comprising at least one processor, memory, and a communication interface, cause the computing platform to:

receive, from a self-service kiosk, first note data associated with a plurality of notes of currency associated with the self-service kiosk, the first note data including a first plurality of note identifiers, the first plurality of note identifiers including a note identifier associated with each note received by the self-service kiosk and dispensed by the self-service kiosk;

detect a triggering event associated with the self-service kiosk, wherein the triggering event includes determining that a predetermined time period has elapsed;

responsive to detecting the triggering event, send, to the self-service kiosk, an instruction to capture second note data for all notes within the self-service kiosk at a current time, wherein sending the instruction to capture the second note data causes the self-service kiosk to initiate a rescan function to capture a second plurality of note identifiers, the second plurality of note identifiers including a note identifier for each note of the all notes within the self-service kiosk at the current time;

receive, from the self-service kiosk, the second note data;

reconcile the self-service kiosk, wherein reconciling the self-service kiosk includes comparing the second note data to the first note data to confirm note identifiers from the first plurality of note identifiers for notes of currency expected to be within the self-service kiosk are present in the second note data;

execute a machine learning model, wherein executing the machine learning model includes providing, as input, reconciliation data determined by the reconciling the self-service kiosk and including the note identifiers from the first plurality of note identifiers for notes of currency expected to be within the self-service kiosk that are present in the second note data, to output a recommended combination of notes for dispensing; and transmit, to the self-service kiosk, the recommended combination of notes for dispensing, wherein transmitting the recommended combination of notes causes the recommended combination of notes to be displayed by a display of the self-service kiosk.

16. The one or more non-transitory computer-readable media of claim 15, wherein the note identifiers include a serial number of a respective note of currency.

17. The one or more non-transitory computer-readable media of claim 15, wherein receiving, from the self-service kiosk, first note data associated with a plurality of notes of currency associated with the self-service kiosk includes:

receiving, from the self-service kiosk, loaded note identifiers captured by an image capture device of the self-service kiosk during a note loading process;

receiving, from the self-service kiosk, deposit note identifiers captured by the image capture device of the self-service kiosk as one or more notes are received during a customer deposit process; and receiving, from the self-service kiosk, withdrawal note identifiers captured by the image capture device of the self-service kiosk as one or more notes are dispensed during a customer withdrawal process.

18. The one or more non-transitory computer-readable media of claim 15, wherein the rescan function includes, for each note within the self-service kiosk at the current time:

removing each note from an initial storage location;

capturing a note identifier for a respective note; and transferring the respective note to a second storage location different from the initial storage location.

19. The one or more non-transitory computer-readable media of claim 18, wherein the second storage location is a cassette within an interior of the self-service kiosk.

20. The one or more non-transitory computer-readable media of claim 18, wherein the second storage location is a storage device external to the self-service kiosk.

21. The one or more non-transitory computer-readable media of claim 15, further including instructions that, when executed by the at least one processor, cause the computing platform to:

analyze the plurality of notes of currency associated with the self-service kiosk to determine a time in circulation for each note of currency of the plurality of notes of currency;

compare the time in circulation for a respective note of currency of the plurality of notes of currency to a threshold time;

responsive to determining that the time in circulation for the respective note of currency is less than the threshold time, storing the respective note in an active cassette within the self-service kiosk for use by the self-service kiosk; and responsive to determining that the time in circulation for the respective note of currency is equal to or greater than the threshold time, transferring the respective note of currency to a temporary storage location for removal from the self-service kiosk.

*     *     *     *     *